United States Patent [19]

Yoshida et al.

[11] Patent Number: 5,806,631

[45] Date of Patent: Sep. 15, 1998

[54] PISTON PIN LUBRICATION

[75] Inventors: Takeo Yoshida; Takahiro Suzuld, both of Iwata, Japan

[73] Assignee: Yamaha Hatsudoki Kabushiki Kaisha, Iwata, Japan

[21] Appl. No.: 777,278

[22] Filed: Dec. 27, 1996

[30] Foreign Application Priority Data

Dec. 29, 1995 [JP] Japan ................................ 7-352986

[51] Int. Cl.⁶ ...................................................... F16N 1/00
[52] U.S. Cl. ............................ 184/18; 184/24; 92/158; 92/153; 92/160; 123/196 R
[58] Field of Search ........................... 92/153, 158, 160, 92/86.5; 184/18, 19, 24; 123/196 R

[56] References Cited

U.S. PATENT DOCUMENTS

| 309,686 | 12/1884 | Bogert | 184/18 |
|---|---|---|---|
| 566,895 | 9/1896 | Dow | 123/196 R |
| 764,886 | 7/1904 | Donnenwerth | 184/18 |
| 878,783 | 2/1908 | Downie | 184/18 |
| 952,824 | 3/1910 | Liberty | 184/18 |
| 1,012,017 | 12/1911 | Gerber | 184/18 |
| 1,404,797 | 1/1922 | Severson | 184/18 |
| 1,408,638 | 3/1922 | Prellwitz | 184/19 |
| 1,427,984 | 9/1922 | Turney | 184/18 |
| 1,636,021 | 7/1927 | Van Ranst | 184/24 |
| 1,816,516 | 7/1931 | Clement | 123/196 R |

FOREIGN PATENT DOCUMENTS

| 32071 | 10/1907 | Germany | 184/18 |

*Primary Examiner*—Thomas E. Denion
*Attorney, Agent, or Firm*—Knobbe, Martens, Olson & Bear LLP

[57] ABSTRACT

A number of embodiments of direct piston pin lubrication systems for reciprocating machines such as internal combustion engines. In all of the embodiments, the hollow interior of the piston pin is employed as a distribution passage with radial drillings extending through the piston pin for lubricating the various journals thereof. In some embodiments, the lubricant is sprayed through the wall of the cylinder bore directly into the piston pin and in others it is delivered through a passage formed in the piston.

9 Claims, 11 Drawing Sheets

PISTON PIN LUBRICATION

BACKGROUND OF THE INVENTION

This invention relates to a reciprocating machine and more particularly to an improved arrangement for lubricating the journals provided by the piston pins in such machines.

In many types of reciprocating machines and particularly two-cycle engines it is the practice to lubricate various components by providing an oil mist in the area of the engine surrounding the components to be lubricated. This oil mist may be generated either by spraying oil into the area or by mixing oil with the fuel, in the case of a two-cycle engine. In many areas of the machine this type of lubricating system is quite satisfactory.

However, one area of the machine where lubrication is critical is in the connection between the piston, the piston pin, and the connecting rod. These journals are disposed in an area that is generally enclosed by the piston and hence it is difficult to deliver lubricant to these areas. If a mist-type system is employed, the entire crankcase chamber must be filled with a fairly rich oil mist and this can escape to the atmosphere through the combustion chamber. Furthermore, the oil that is consumed in the combustion process to avoid escape to the atmosphere can cause large amounts of undesirable deposits.

It may be possible to provide an oil passage arrangement through the connecting rod that will deliver the oil to the piston pin journals. This is normally done by drilling a passage through the length of the connecting rod from the big end to the small end. However, this type of system is not only expensive but also may not be adequate in delivering the oil to the pivotal connection between the piston and the piston pin.

It is, therefore, a principal object of this invention to provide an improved lubricating system for a reciprocating machine.

It is a still further object of this invention to provide an improved method and apparatus for lubricating the piston pin journals of a reciprocating machine.

SUMMARY OF THE INVENTION

This invention is adapted to be embodied in a reciprocating machine lubricating system. The machine comprises a cylinder that defines a cylinder bore in which a piston reciprocates. A connecting rod has a big end journaled on a crankshaft and a small end that extends within the piston. A piston pin is journaled on the small end of the connecting rod and has its end portions journaled in the piston for transmitting motion between the piston and the crankshaft. An oil passage extends axially through the piston pin. The piston pin is formed with at least one delivery port that extends from the oil passage to at least one of the journal surfaces of the piston pin for delivering lubricant thereto. Means are provided for delivering oil to the piston pin oil passage.

2

DETAILED DESCRIPTION OF THE PREFERRED EMBODIMENTS OF THE INVENTION

Figure 1:
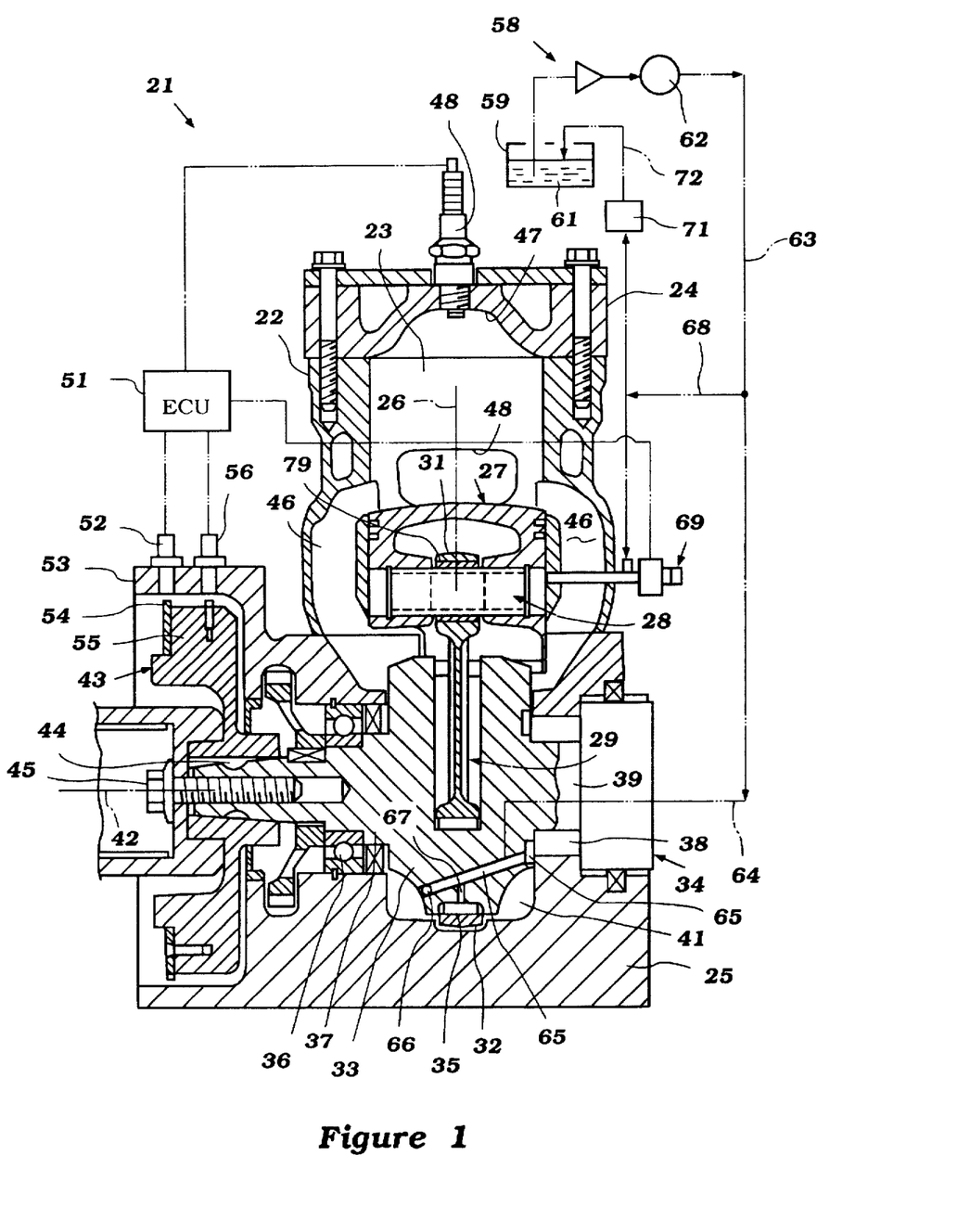
FIG. 1 is a cross-sectional view taken through a single cylinder of an engine constructed and lubricated in accordance with an embodiment of the invention, with portions of the lubricating system being shown schematically.

Referring now in detail to the embodiment of FIGS. 1–5 and initially primarily to FIG. 1, an internal combustion engine constructed in accordance with this embodiment is identified generally by the reference numeral 21. In the illustrated embodiment, a single cylinder, two-cycle crankcase compression internal combustion engine is depicted. Although the invention is described in conjunction with only a single cylinder engine and a two-cycle crankcase compression engine, as will become more apparent as the description proceeds, the invention can be utilized with a wide variety of types of engines including multiple cylinder engines. Some features of the invention also may be employed, as will become apparent by description of the embodiments of FIGS. 8,9 and 10, with four-cycle engines. The invention has particular utility, however, in connection with two-cycle engines because of the normal inability of this type of engine to have a recirculating lubricating system.

The engine 21 is comprised of a cylinder block 22 that forms a cylinder bore 23. One end of the cylinder block 22 is closed by a cylinder head 24 that is detachably affixed thereto. The other end of the cylinder block 22 is closed by a crankcase member 25 which is also detachably connected thereto in known manner.

The axis of the cylinder bore 23 is indicated by the line 26. A piston 27 reciprocates in this cylinder bore 23 about a reciprocal axis that is coincident with the cylinder bore axis 26. A piston pin 28 pivotally connects the piston 27 to the upper or small end of a connecting rod, indicated generally by the reference numeral 29, with the small end being designated as 31.

The connecting rod 29 has a big end 32 that is journaled on a throw 33 of a crankshaft, indicated generally by the reference numeral 34. A roller or needle type bearing arrangement 35 is interposed between the crankshaft throw 33 and the connecting rod big end 32.

The crankshaft 34 is journaled within the crankcase member 25 by means of a ball bearing assembly 36 which cooperates with a bearing portion 37 of the crankshaft. In addition, a needle bearing assembly 38 cooperates with a further portion 39 of the crankshaft 34 to complete its rotational support. The crankshaft 34 rotates primarily in a crankcase chamber 41 that is formed by the crankcase member 25 and the lower portion of the cylinder block 22 and which has its upper extremity defined by the bottom of the piston 27.

The crankshaft 34 rotates about an axis 42 that extends transversely to the cylinder bore axis 26. A flywheel assembly 43 is affixed to one end of the crankshaft 39 by means of a key way connection 44 and a threaded fastener 45.

Continuing to refer primarily to FIG. 1, the engine 21 is provided with induction and charge forming system which is not illustrated but which may be of any known type. This system delivers an intake charge to the crankcase chamber 41 through an induction manifold which includes a read-type valve assembly, which is also not shown. This charge is then compressed in the crankcase chamber 41 when the piston 27 moves downwardly.

This compressed charge is then transferred to the area above the head of the piston 27 through one or more scavenge passages 46 which terminate in scavenge ports 47 that open into the cylinder bore 23. These ports 47 are opened and closed by the reciprocating motion of the piston 27, as is well known in this art.

The charge thus transferred to the combustion chamber formed by the cylinder head 24 and specifically a recess 48 therein, the cylinder bore 23 and the head of the piston 27 is further compressed as the piston 27 moves upwardly and closes the scavenge ports 47. At a point before top dead center, a spark plug 49 mounted in the cylinder head assembly 24 is fired. This firing is controlled by an ECU and ignition circuit, indicated generally by the reference numeral 51.

The ECU 51 receives information regarding the rotational position of the crankshaft by means of a crank angle sensor 52 that is mounted in a flange 53 which encircles the flywheel 43. This sensor 52 cooperates with a starter gear 54 that is affixed to an enlarged portion 55 of the flywheel 43 so as to output crank angle signals, as is well known in the art. A further top dead center indicator 56 cooperates with a flywheel marker 57 so as to discriminate when a specific piston of the engine has reached its top dead center position.

The charge fired by the spark plug 49 will burn and expand to drive the piston 27 downwardly. At a stage of this downward motion, an exhaust port (not shown) will be opened and the burned charge can exit the combustion chamber and specifically the cylinder bore 23 in a well-known manner. A suitable exhaust system (not shown) is provided for discharging the exhaust gases to the atmosphere and silencing and/or catalytically treating them, if desired.

The engine 21 as thus far described may be considered to be conventional. From the following description it will become apparent how the invention can be utilized with a wide variety of types of engines having different constructions including those of the type which have been described.

The engine 21 is provided with a lubricating system, which is indicated generally by the reference numeral 58 and which is shown in part schematically. This schematic illustration includes a showing of an oil tank 59 which can be appropriately positioned and in which a lubricant such as oil 61 is contained. A pump 62 draws oil from the oil tank 59 through a suitable conduit and delivers to a supply conduit shown schematically at 63. This supply conduit 63 has two branches including a first branch 64 which supplies lubricant to the crankshaft and particularly the big end bearing 35 of the connecting rod 29.

To this end, the lubricant is delivered from the conduit 64 into a recess 65 which is formed adjacent to and lubricates the main bearing 38. This recess 65 is formed in a face of the crankshaft 34 and is cross-drilled at 65. The cross-drilling 65 is closed at one end by a plug 66. A radially extending drilling 67 extends from the cross-drilling 65 to the bearing area 35 for its lubrication.

The main lubricant conduit 63 is intersected by a branch conduit 68 that supplies a pumping system 69 for delivering lubricant to the piston pin 28 and its bearing surfaces with the piston 27 and connecting rod small end 31. This construction will be described in more detail later, by particular reference to FIGS. 2–4. This lubricating system is also controlled by the ECU 51 in a manner that will be described.

In addition to supplying the pumping system 69 for the lubrication of the piston pin 28, the conduit 68 also feeds a pressure control valve 71 that controls the pressure in the conduit 63, 64 and 68 by dumping excess lubricant back to the storage tank 59 through a return conduit 72.

Figure 2:
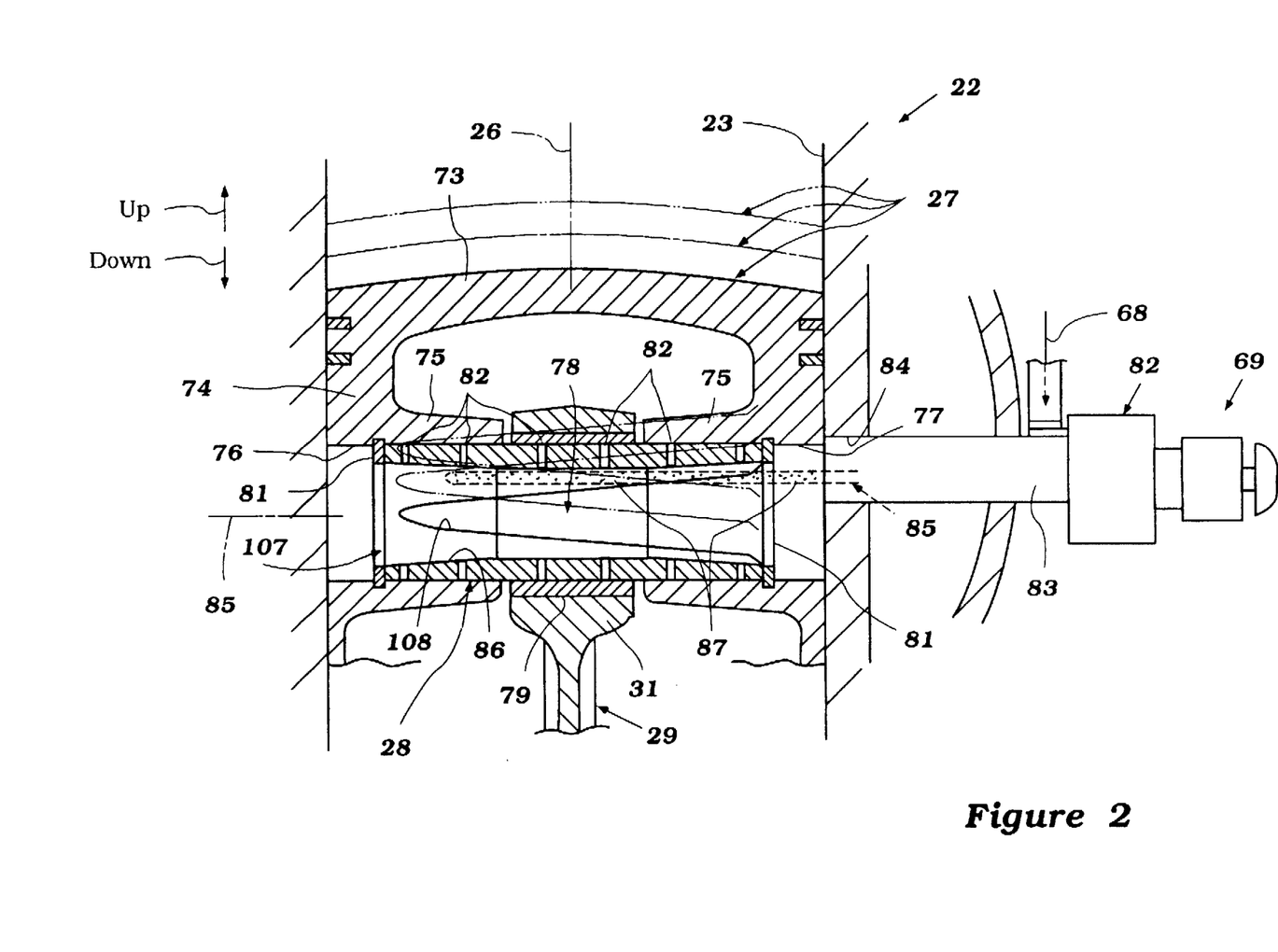
FIG. 2 is an enlarged cross-sectional view taken along the same plane as FIG. 1 but shows in more detail the arrangement for delivering lubricant to the piston pin.
Figure 3:
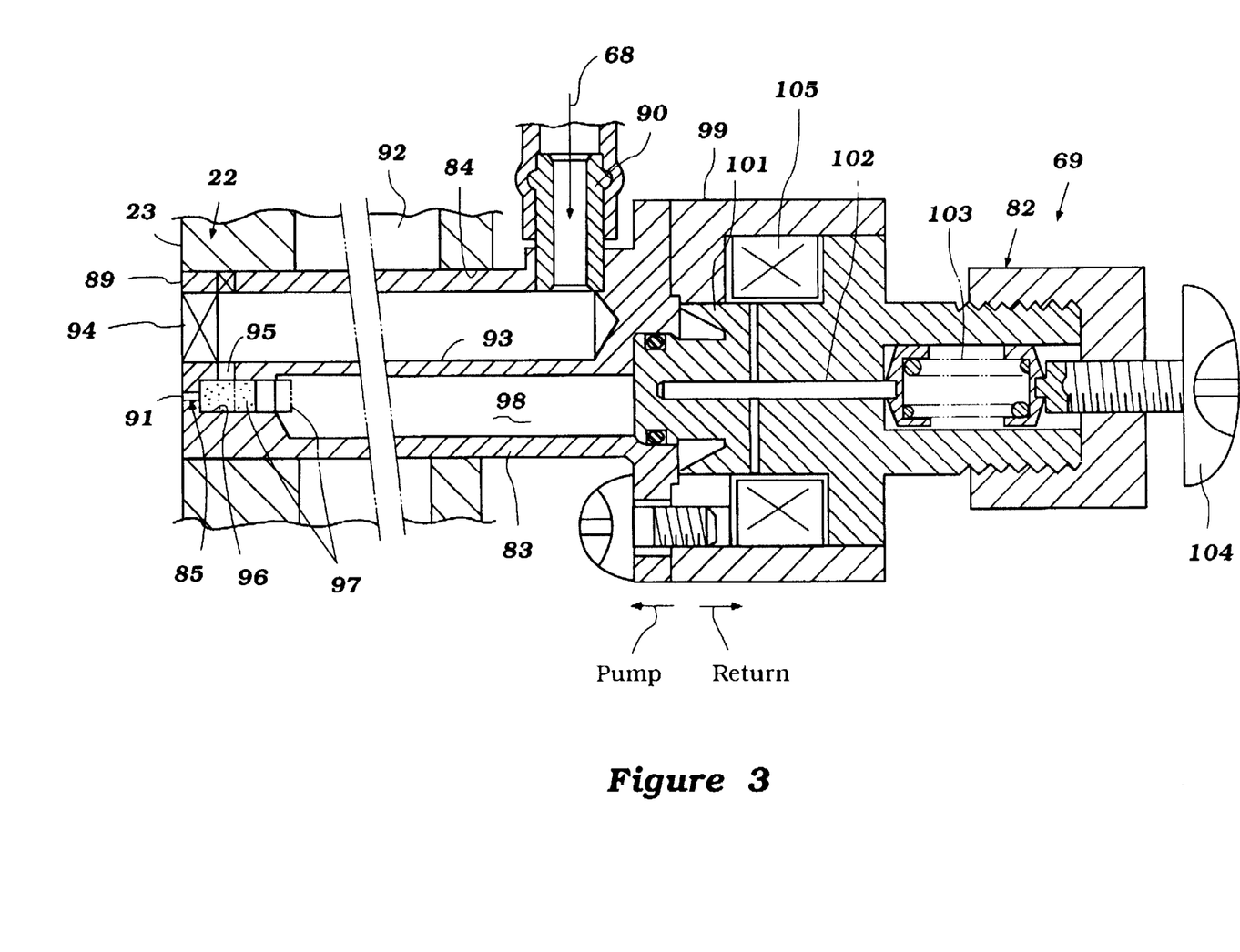
FIG. 3 is a further enlarged cross-sectional view taken along the same plane as FIG. 2 and shows further details of the construction of the lubricant delivery system.
Figure 4:
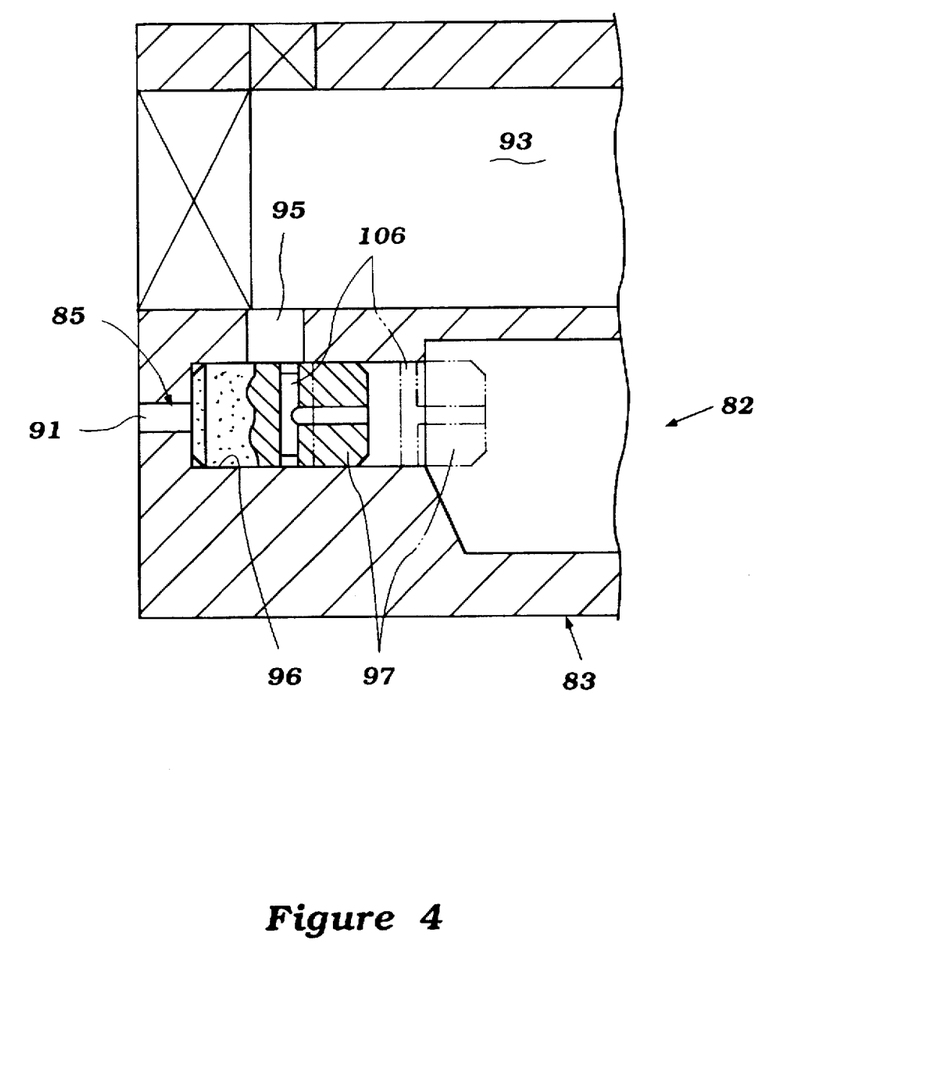
FIG. 4 is a yet further enlarged cross-sectional view taken along the same plane as FIGS. 1–3 and shows the actual lubricant pumping arrangement for pumping lubricant into the piston pin.

Referring now primarily to FIGS. 2–4 and initially primarily to FIG. 2, the piston pin lubrication pumping system 69 will be described in more detail. In FIG. 2, the piston 27 is shown in solid lines in a position that is at its bottom dead center position as seen also in FIG. 1. In addition, the piston 27 is shown in dotted lines in two additional positions which correspond to initial movement toward its top dead center position. The up and down directions of the movement of the piston 27 are shown by the arrows to the left of FIG. 2.

The piston 27 is comprised of a head portion 73 that terminates in a skirt portion 74. The skirt portion 74 is formed with a pair of inwardly extending piston receiving bosses 75 which are formed with bores 76 and 77 to pass the piston pin 28. The piston pin 28 is, as is typical with piston pin construction, hollow so that it forms an internal cavity 78. In accordance with an important feature of the invention, this cavity 78 is utilized as a lubricant passage for lubricating the piston pin 28, the bores 76 and 77 of the piston pin bosses 75 and a bearing 79 that is interposed between the small end 31 of the connecting rod 29 and the piston pin 28.

The piston pin 28 is retained within the bores 76 and 77 by retainer clips 81. As may be best seen in FIG. 2, the piston pin 28 is provided with a number of through drillings 82 which drillings intersect the areas where the piston pin 28 engages the bores 76 and 77 and where it engages the connecting rod bearing 79. By delivering lubricant into the hollow interior 78 of the piston 28, this lubricant may flow through the cross-drillings 82 and lubricate these surfaces.

Oil is delivered to the hollow interior 78 of the piston pin 28 by a pumping mechanism, indicated generally by the reference numeral 82 and which has a construction which will be described in more detail shortly by reference primarily to FIGS. 3 and 4. Before referring to these figures, however, it should be noted that the pumping mechanism 82 has a cylindrical body 83 that is received in a bore 84 of the cylinder block 22 and which intersects the cylinder bore 23 in an area that is encompassed by the piston pin receiving bore 77, which has an axis 85, when the piston 73 is in its bottom dead center position. The pumping device body 83 has a discharge nozzle 85 that is disposed so as to be closely adjacent the inner piston pin surface 86 that defines the cavity 78 at this bottom dead center position.

Hence, the oil spray 87 from the pumping device 82 will be concentrated in this area when the piston 27 is at its bottom dead center position. This spray will deposit in areas on the piston pin surface 86 as the piston moves upwardly. The pumping device 82 is operated so as to spray primarily when the piston 27 is in the vicinity of its bottom dead center position. Alternatively, the pumping device 82 also may be operated at a portion later in the stroke so that it will lubricate the piston skirt 74 in addition to the piston pin 28 and its bearing surfaces with the piston 27 and the connecting rod 29.

If preferred the pumping device 82 may be positioned higher in the cylinder bore 23 in a location where it will face the piston pin receiving bore 77 near top dead center of the piston 27.

Lubricant which has deposited on the piston pin surface in the areas 88 will flow through the drillings 82 due inertial forces during the reciprocation of the piston and lubricate the boss bores 76 and 77 and the connecting rod small end bearing 79 as well as the exterior surfaces of the piston pin 28. Other means for improving oil distribution and retention will be described later.

Referring now in detail to FIGS. 3 and 4, the pumping device 82 has, as noted, a cylindrical portion 83 that extends into the cylinder block opening 84 and which terminates at an end portion 89 which is aligned with the cylinder bore 23 and through which an orifice 91 of the pumping delivery opening 85 previously referred to extends. This cylindrical housing portion 83 also passes through a water jacket 92 which encircles the cylinder bore 23 and is formed integrally within the cylinder block 22.

A first bore or delivery chamber 93 extends at the upper portion of the housing 83 and is closed by a closure plug 94. A nipple 95 cooperates with the supply conduit 68 so that oil can be delivered into the bore 93. This oil can pass through a small supply orifice 95 to a pumping chamber formed by a bore 96 which is seen best in FIG. 4. A pumping plunger 97 is slidably supported in the bore 96 and is moveable between a delivery position, as shown in solid lines wherein lubricant is forced out of the orifice 91, and a retracted position, as shown in phantom lines wherein lubricant may be drawn into the bore 96 through the supply passage 95.

The pumping bore 96 is formed at one end of an enlarged drive chamber 98 which extends axially through the housing piece 83 and terminates within a driving assembly 99 that contains a driving plunger 101. The driving plunger 101 is reciprocal between a pumping direction and return direction indicated by the arrows in FIG. 3 in a manner which will now be described.

The driving plunger 101 is urged to the end of its pumping stroke by means of a drive pin 102 which is acted on by a coil compression spring 103. The preload of the spring 103 can be adjusted by a turn screw 104.

A solenoid winding 105 encircles the armature which is formed by the driving plunger 101 and draws it to the return stroke. When this happens, the effective volume of the chamber 98 will increase and the pumping plunger 97 will move to its retracted position as shown in the solid line view of FIG. 4. In this position, an air pressure relief passage 106 in the pumping plunger 97 will be closed and the decreased pressure in the chamber 98 will cause this movement of the pumping plunger 97. During this movement, oil may be drawn through the delivery port 95 into the pumping bore 96.

When the winding 105 is deenergized, the compressed spring 103 will expand and force the pin 102 and driving plunger 101 toward the position in the pumping direction and toward the position shown in FIG. 3. This will increase the pressure in the chamber 98 and cause the pumping plunger 97 to be forced to the left. This will expel the lubricant from the pumping bore 96 into the spray 87 shown in FIG. 2.

When the pumping plunger 97 moves so that the pressure relief passage 106 communicates with the supply orifice 95, further movement will be retarded. Hence, no return spring is required for the pumping plunger 97 and no mechanical connection to it is required. Thus, the system can operate very easily.

The amount of oil delivered can be varied by changing the frequency of actuation of the pumping device 82 as should be readily apparent. This cycle can be repeated as often as desired. As has been noted, the ECU 51 is programmed to repeat the number of pumping cycles as frequently as required to supply the necessary amount of lubrication without supplying excess and unnecessary lubricant. As has been noted, the pumping device 82 may also be operated so that one or more cycles take place when the piston skirt 74 is aligned with the orifice 85 to lubricate it and the cylinder bore 23.

If desired a porous plug 107 may be inserted in the piston pin opening 78. The plug 107 may be formed from a sintered metal of adequate porosity to hold and distribute the oil to the drillings 82. The plug 107 has a conical center opening 108. The larger diameter portion of this opening 108 faces the pumping nozzle 85 and is adjacent the pin receiving bore 77.

Figure 5:
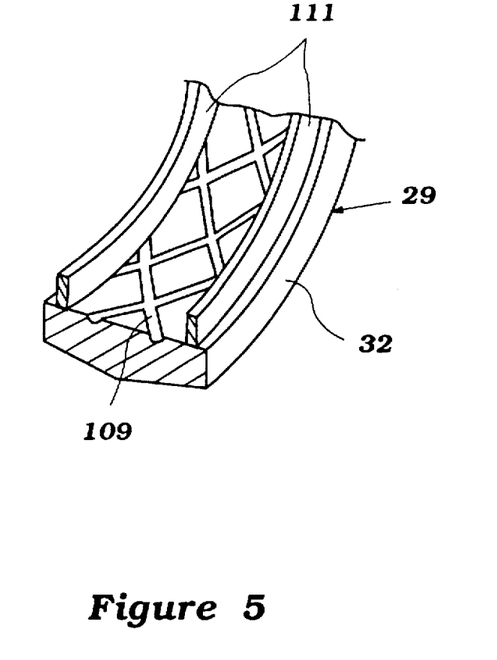
FIG. 5 is an enlarged perspective broken-away view of a portion of the big end of the connecting rod.

FIG. 5 shows an arrangement wherein the lubrication of the connecting rod big end bearing 35 can be further improved. In this embodiment, the interior surface of the big end 32 is formed with cross-grooving 109 which is bounded by upstanding retaining walls 111 so as to ensure that the lubricant delivered to the bearings 35 which do not appear in FIG. 5 will be retained.

Figure 6:
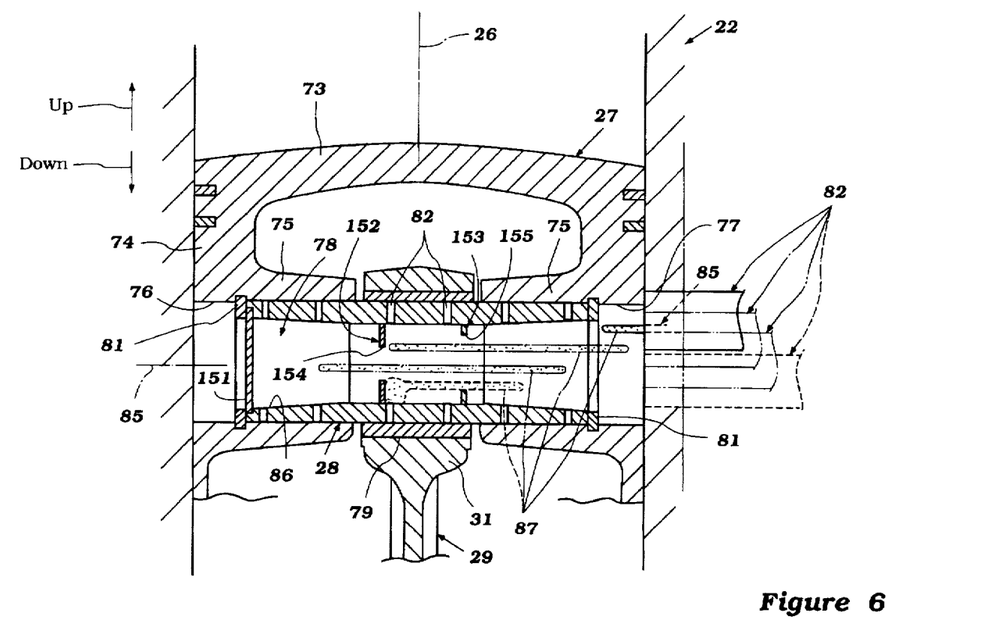
FIG. 6 is an enlarged cross-sectional view, in part similar to FIG. 2 and shows another embodiment of the invention and during several positions of the piston stroke.
Figure 7:
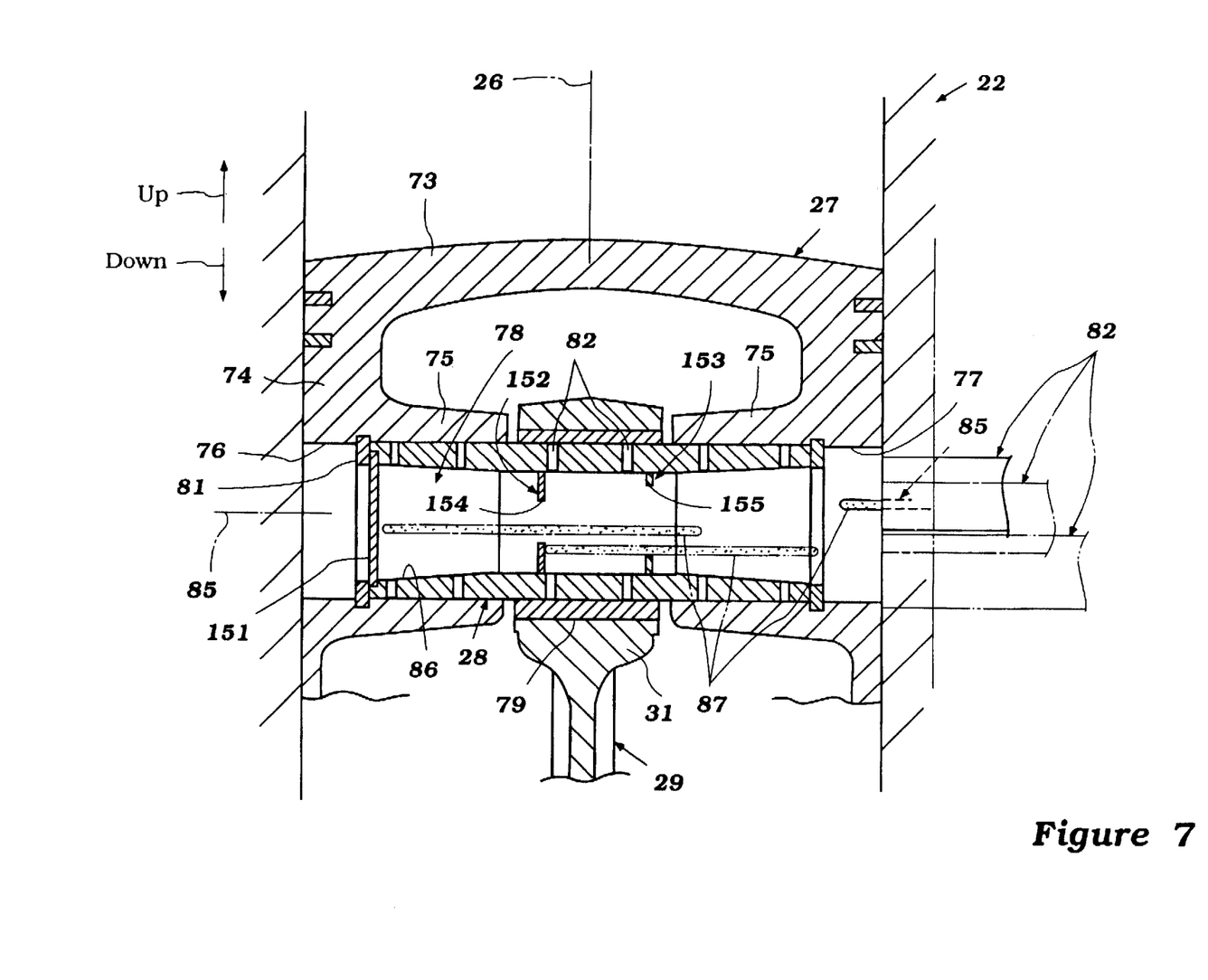
FIG. 7 is a cross-sectional view, in part similar to FIG. 6, and shows another embodiment of the invention.

FIGS. 6 and 7 show two other embodiment of the invention which are basically the same as the embodiment of FIGS. 1–5. For that reason, only one view of each embodiment which correspond to the view of FIG. 2 but showing the piston 27 are believed to be sufficient to permit those skilled in the art to understand the construction and operation of these embodiments. Also, where components are the same or substantially the same as those previously described, the same reference numerals have been utilized to indicate these components. The only difference between these two embodiments is the timing of oil injection and hence the same parts are identified by the same reference numbers.

In addition, the position of the pumping device 82 and specifically its cylindrical portion 83 and discharge nozzle 85 are shifted in these figures to show how the spray enters the piston pin opening 78 at different positions. This is done to illustrate how these embodiments are constructed and operated so as to insure that the lubricant will be distributed equally to all lubricated surfaces.

In these embodiments, one end of the piston pin cavity 78, that in the bore 76 of the boss 75 is closed by a closure plate 151. The snap ring 81 in this bore holds the closure plate 151 in position.

In the area on the opposite side of the two cross-drillings 82 that serve the connecting rod small end bearing 79 there are provided a pair of flow control rings 152 and 153 having respective openings 154 and 155. The opening 155 is larger than the opening 154. As may be seen in FIGS. 6 and 7, the control ring 152 will obstruct some of the oil flow and preclude it from passing to the area of the piston pin boss bore 76.

If the pumping device 82 has sufficient force to expel fluid the whole length of the piston pin cavity 78, the connecting rod bearing 79 and cavity 77 might not receive adequate lubrication. Thus, the ring 152 ensures that the connecting rod bearing 79 will receive adequate oil. The ring 153 blocks some oil also and directs it to the cavity 77. Hence, these embodiments will ensure equal lubrication and this can be adjusted by adjusting the size of the ring openings 154 and 155 as well as the positions at which the pumping device 82 is operated.

In the embodiment of FIG. 6 the pump 82 is operated to begin injections at or before the piston 27 reaches bottom dead center and thus the upper portions of the rings 152 and 153 will block some flow from passing along the length of the piston pin 28. In the embodiment of FIG. 7 the initiation of oil delivery begins later, such as after bottom dead center and hence only the lower portions of the rings 152 and 153 block the oil flow, as seen in this figure.

Figure 8:
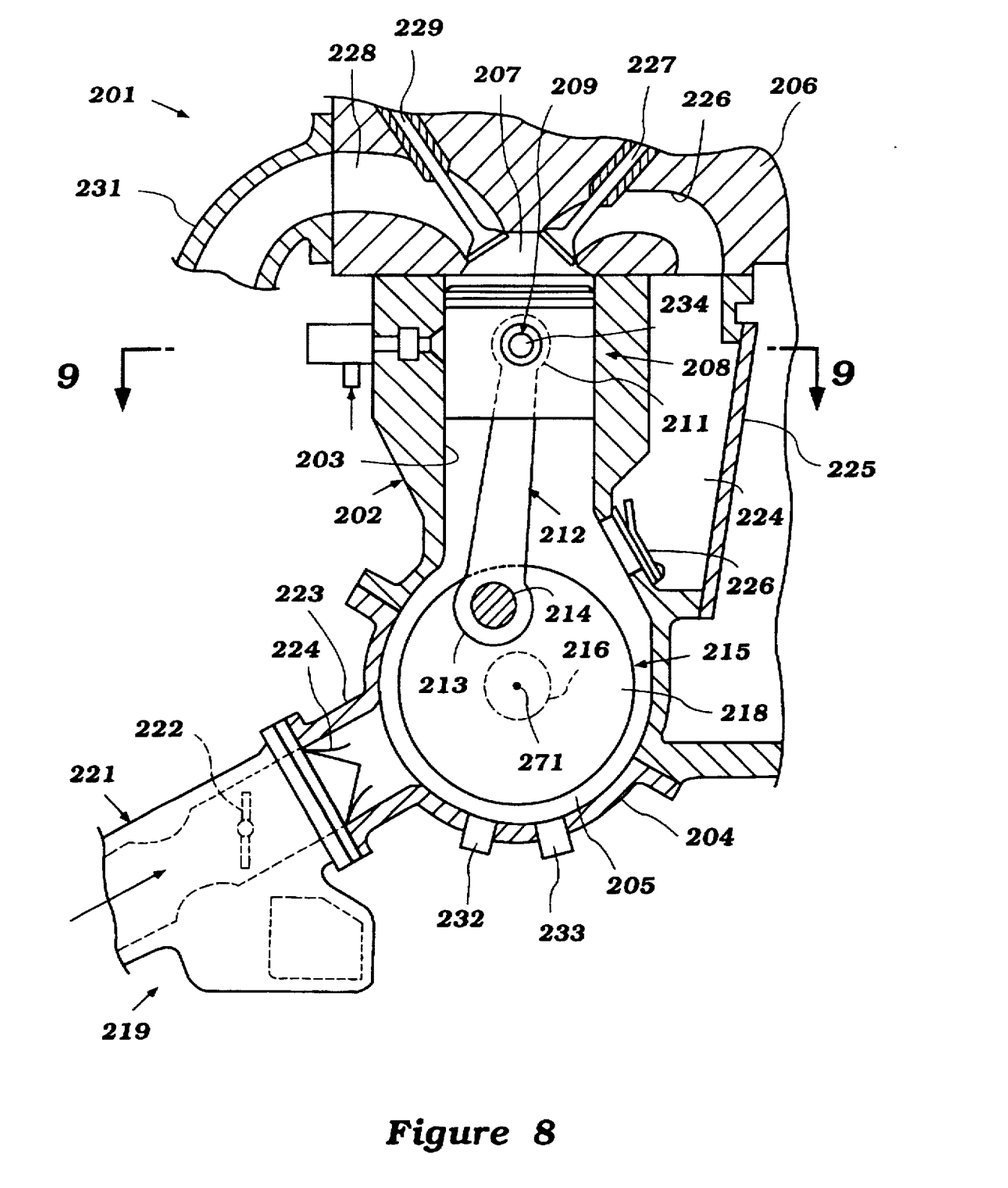
FIG. 8 is a cross-sectional view, in part similar to FIG. 1, of an engine constructed in accordance with another embodiment of the invention.
Figure 9:
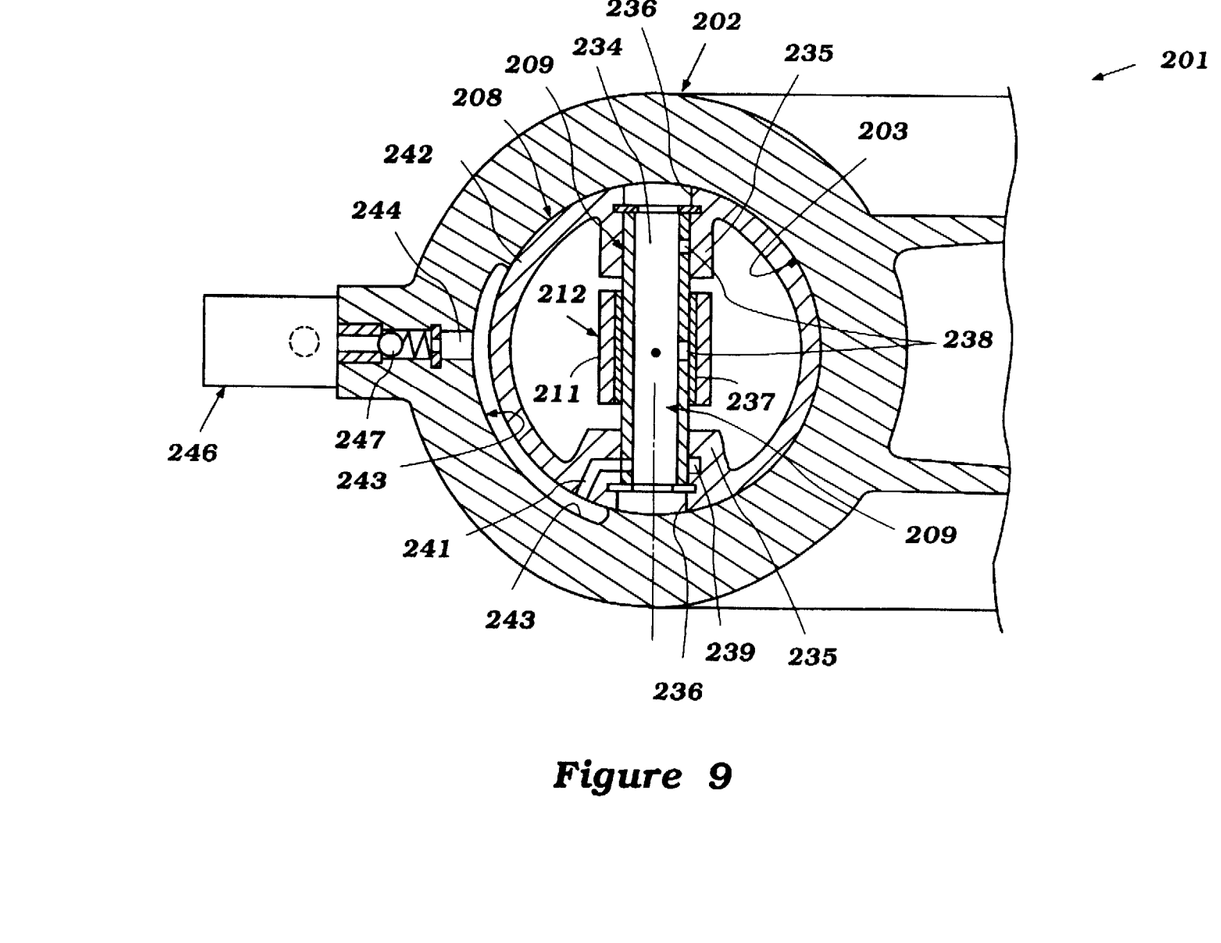
FIG. 9 is a cross-sectional view taken along the line 9—9 of FIG. 8.

FIGS. 8 and 9 show another embodiment of the invention. In this embodiment, an engine, indicated generally by the reference numeral 201 of the crankcase compression supercharged 4-cycle type is employed. This depicts that certain features of the invention can also be utilized with 4-cycle engines and particularly with 4-cycle engines of a type where recirculating lubricating systems may not be feasible or desirable. In this embodiment, like the previously described embodiment, only a single cylinder is depicted as it will be apparent to those skilled in the art how the invention may be practiced with multiple cylinder engines of varying configurations.

The engine 201 is comprised of a cylinder block 202 having a cylinder bore 203. The lower end of the cylinder bore 203 is closed by a crankcase member 204 that is affixed to the cylinder block 202 in any suitable manner and which forms a crankcase chamber 205.

The opposite end of the cylinder bore 203 is closed by a cylinder head assembly 206 having a recess 207 that faces the cylinder bore 203 and which forms in part the combustion chamber. The cylinder head 206 is affixed to the cylinder block 202 in any known manner.

A piston, indicated generally by the reference numeral 208, is supported for reciprocation within the cylinder bore 203. A piston pin 209 connects the piston 208 to a small end 211 of a connecting rod indicated generally by the reference numeral 212.

The connecting rod 212 has a big end 213 that is journaled on a throw 214 of a crankshaft, indicated generally by the reference numeral 215. The crankshaft has bearing portions 216 that are journaled within the crankcase member 205 in a suitable manner for rotation of the crankshaft 215 about a rotational axis 217 and within the crankcase chamber 205.

Disc-shaped portions 218 are formed on the crankshaft 215 for sealing purpose between adjacent crankcase chambers 205 particularly if the engine 201 is of the multiple cylinder type. In any event, the crankcase chambers 205 are sealed so that they can permit compression of a charge therein in a manner which will be described.

An induction system, indicated generally by the reference numeral 219 is provided for delivering a fuel air charge to the crankcase chamber 205 for compression therein. This system includes a charge former such as a carburetor 221 in which a throttle valve 222 is positioned for controlling the flow into an intake manifold 223. A read-type check valve 224 is provided in this intake manifold 223 so that the charge can be drawn into the crankcase 205 when the piston 208 moves upwardly and to preclude reverse flow on downward motion.

The charge which is drawn into the crankcase chamber 205 during this movement is then transferred to a pressure reservoir 224 formed at one side of the cylinder block 202 enclosed by a closure plate 225. A further check valve 226 permits flow into the pressure reservoir 224 and precludes reverse flow.

The pressure reservoir 224 communicates with an intake passage 226 which communicates with the combustion chamber 207 through a valve seat which is controlled by a poppet-type intake valve 227. The intake valve 227 is operated by a suitable operating mechanism. The thus compressed charge is delivered to the combustion chamber and then fired by a spark plug (not shown) in a known manner.

This charge then can exit the combustion chamber during the exhaust stroke through an exhaust passage 228 formed in the cylinder head 206 and valved by a poppet-type exhaust valve 229. The exhaust valve 229 is also operated, like the intake valve 227, in any appropriate manner. The exhaust passage 228 communicates with an exhaust manifold 231 which, in turn, cooperates with a suitable exhaust system.

A pair of sensors 232 and 233 are mounted in the crankcase member 204 and cooperate with suitable markers on the disk 218 of the crankshaft 215 so as to provide top dead center and crank angle position indication.

The lubricating system for delivering lubricant to the hollow interior 234 of the piston pin 209 for a lubrication of the various journals will now be described by reference to FIG. 9.

As seen in FIG. 9, the piston 208 has bosses 235 that are formed with bores 236 in which the ends of the piston pin 209 are journaled. Also as seen in this figure, the connecting rod small end 211 is provided with a bearing 237 which engages the central portion of the piston pin 209.

The piston pin 209 is provided with a pair of cross drillings 238. One of the cross drillings communicates with the connecting rod small end bearing 237 and the other of which communicates with one of the piston pin bosses 235. Lubricant which is delivered to the hollow interior 234 of the piston 209, in a manner to be described, can flow through these cross drillings 238 to lubricate these areas. It should be understood that the size and number of the cross drillings may be chosen to provide the adequate amount of lubrication.

The remaining piston pin boss 235 is formed with a circumferential groove 239 which surrounds the adjacent end of the piston pin 209. A drilled passageway 241 extends through the skirt 242 of the piston 208 and intersects this groove 239. A circumferential slot 241 for oil delivery purposes is formed in the cylinder bore 203 and extends from a delivery port 242 to a discharge port 243 which discharge port is positioned so as to aligned with the piston drilling 241 during a portion of the piston stroke.

A pumping device, indicated generally by the reference numeral 244 delivers oil under pressure to the groove portion 242 through a radial passage 245 in which a check valve 246 is positioned. The pump 244 may be operated in any manner such as that previously described and may be provided with an oil supply system also of the type previously described.

The oil that flows into the piston pin cavity 209 can flow through the drillings 238 to lubricate the bearing 237 and the one end of the piston pin 209 and the bore 236 of the boss 235. The other piston pin end is lubricated by the oil in the groove 238 which can flow to adjacent areas of the bore 236 of the boss 235 and the end of the piston pin 209.

Figure 10:
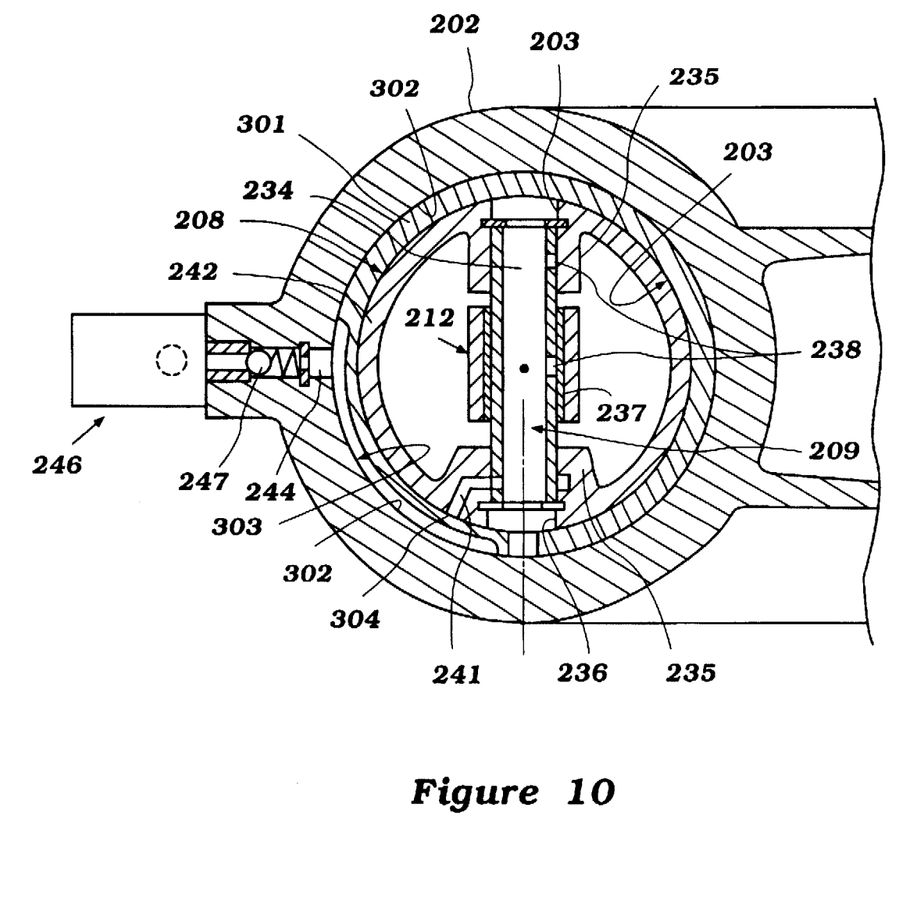
FIG. 10 is a cross-sectional view, in part similar to FIG. 9, and shows another embodiment of the invention.
Figure 11:
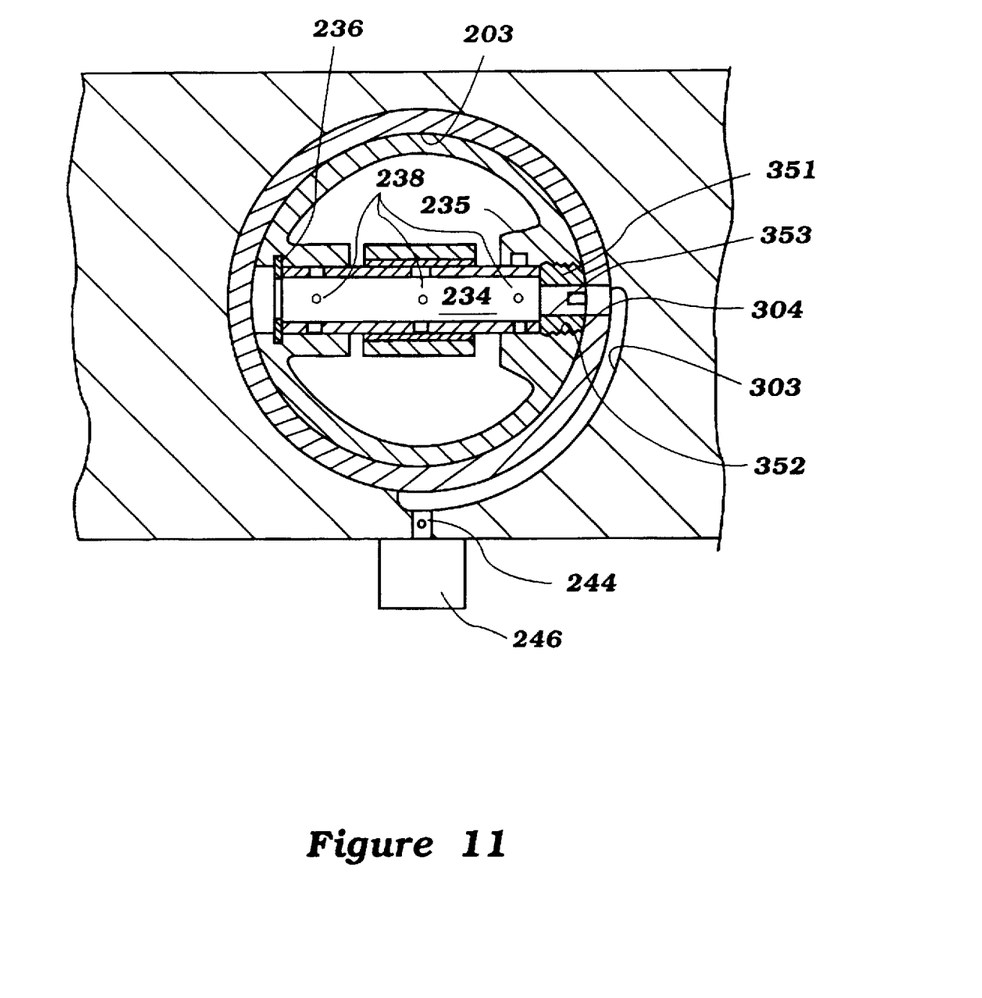
FIG. 11 is a cross-section view, in part similar to FIGS. 9–10, and shows another embodiment of the invention.

FIG. 10 shows another embodiment which is basically the same as the embodiment of FIGS. 8 and 9 differing only in the way the cylinder bore is formed and the oil is delivered through the cylinder bore to the piston pin cavity 209. Thus, all other components have been identified by the same reference numerals and will not be described again, except insofar as is necessary to understand the construction and operation of this embodiment.

In this embodiment, the cylinder block 202 does not directly form the cylinder bore 203. Rather, the cylinder bore 203 is formed by a cylinder liner 301 that is pressed or otherwise held in place in the cylinder block 202 and specifically in a cylindrical bore 302 thereof. The outer surface of the cylinder liner 301 is formed with an oil delivery groove 303 which extends from the delivery passage 245 in the block 202 and which terminates at a port 304 that extends through the liner and communicates with the piston drilling 241.

Thus, from the foregoing description it should be readily apparent that the described embodiments of the invention provide very good lubricating systems for engines or other similar types of reciprocating machines. Specifically, the arrangements provide good and complete lubrication for the pivotal connection between the piston and the connecting rod by lubricating the piston pin bosses, connecting rod small end and piston pin without necessitating drillings in the connecting rod. Of course, the described embodiments are only preferred embodiments and various changes and modifications may be made without departing from the spirit and scope of the invention, as defined by the appended claims.

What is claimed is:

1. A reciprocating machine lubricating system comprised of a cylinder defining a cylinder bore, a piston reciprocating in said cylinder bore, a connecting rod having a big end journaled on a crankshaft and a small end extending within said piston, a piston pin journaled in the small end of said connecting rod and having end portions journaled in said piston for transmitting motion between said piston and said crankshaft, an oil passage formed by an opening extending at least partially through the axial extent of said piston pin, a plurality of delivery passages extending through said piston pin from said oil passage to the journaled surfaces of said piston pin, pressure pumping means for delivering oil to said oil passage through an open end of the piston pin and through an opening in said piston which passes said piston pin and through an opening formed in said cylinder bore, and restrictions formed by progressively sized axially spaced openings formed at various lengths along said oil passage of said piston pin and coaxial therewith for controlling the distribution of oil through the piston pin lubricant passages.

2. A reciprocating machine as set forth in claim 1, wherein oil is delivered to the piston pin by the pressure pumping means only during a portion of the stroke of the piston.

3. A reciprocating machine lubricating system comprised of a cylinder defining a cylinder bore, a piston reciprocating in said cylinder bore, a connecting rod having a big end journaled on a crankshaft and a small end extending within said piston, a piston pin journaled in the small end of said connecting rod and having end portions journaled in said piston for transmitting motion between said piston and said crankshaft, an oil passage formed by an opening extending at least partially through the axial extent of said piston pin, a plurality of delivery passages extending through said piston pin from said oil passage to the journaled surfaces of said piston pin, pressure pumping means for delivering oil to said oil passage through an open end of the piston pin and through an opening in said piston which passes said piston pin and through an opening formed in said cylinder bore, and an axially extending porous member received in the piston pin opening.

4. A reciprocating machine as set forth in claim 3, wherein oil is delivered to the piston pin only during a portion of the stroke of the piston.

5. A reciprocating machine as set forth in claim 4, wherein there is a pump provided which registers directly with the cylinder bore opening for supplying the oil to the piston pin.

6. A reciprocating machine lubricating system comprised of a cylinder defining a cylinder bore, a piston reciprocating in said cylinder bore, a connecting rod having a big end journaled on a crankshaft and a small end extending within said piston, a piston pin journaled in the small end of said connecting rod and having end portions journaled in said piston for transmitting motion between said piston and said crankshaft, an oil passage extending axially through said piston pin formed by an opening extending at least partially through the axial extent thereof, at least one delivery passage extending through said piston pin from said oil passage to at least one of said journaled end portions of said piston pin, and means for delivering oil to said oil passage through an open end of the piston pin opening through an opening in the piston which passes the piston pin, and a porous member received in the piston pin opening said porous member being formed with a conical opening.

7. A reciprocating machine as set forth in claim 6, wherein oil is delivered to the piston pin only during a portion of the stroke of the piston.

8. A reciprocating machine as set forth in claim 7, wherein oil is delivered to the piston through an opening formed in the cylinder bore.

9. A reciprocating machine as set forth in claim 8, wherein there is a pump provided which registers directly with the cylinder bore opening for supplying the oil to the piston pin.

* * * * *